(12) United States Patent
Franklin et al.

(10) Patent No.: US 11,269,845 B1
(45) Date of Patent: Mar. 8, 2022

(54) TECHNIQUES TO CONFIGURE MEDIA PACKAGES

(71) Applicant: Facebook, Inc., Menlo Park, CA (US)

(72) Inventors: Alexander Salem Franklin, San Francisco, CA (US); Matthew Steiner, Los Altos, CA (US); Seth Garrett Steinberg Rosenberg, San Francisco, CA (US)

(73) Assignee: META PLATFORMS, INC., Menlo Park, CA (US)

( * ) Notice: Subject to any disclaimer, the term of this patent is extended or adjusted under 35 U.S.C. 154(b) by 388 days.

(21) Appl. No.: 16/255,009

(22) Filed: Jan. 23, 2019

Related U.S. Application Data

(63) Continuation of application No. 14/973,463, filed on Dec. 17, 2015, now Pat. No. 10,223,400.

(51) Int. Cl.
*G06F 16/23* (2019.01)
*G06F 16/2457* (2019.01)
(Continued)

(52) U.S. Cl.
CPC ........ *G06F 16/23* (2019.01); *G06F 16/24575* (2019.01); *G06F 16/9535* (2019.01);
(Continued)

(58) Field of Classification Search
CPC .............. G06F 16/23; G06F 16/24575; G06F 16/9535; G06F 16/245; G06F 16/183;
(Continued)

(56) References Cited

U.S. PATENT DOCUMENTS 7,925,716 B2 * 4/2011 Zhang .................. G06Q 10/107
709/218
8,026,805 B1 * 9/2011 Rowe ................. H04N 21/4532
340/539.1
(Continued)

FOREIGN PATENT DOCUMENTS

CN 102904798 A 1/2013
CN 103475572 A 12/2013

OTHER PUBLICATIONS

Obamas Complete Victory Speech | Election 2012 | The New York Times—YouTube—URL: https://www.youtube.com/watchv=nv9NwKAjmt0 feature=g logo.

*Primary Examiner* — Hosain T Alam
*Assistant Examiner* — Robert F May
(74) *Attorney, Agent, or Firm* — Kacvinsky Daisak Bluni PLLC

(57) ABSTRACT

Techniques to configure media packages are described. In one embodiment, an apparatus may comprise a client support component operative to receive search term information from a client device at a server device; and configure the client device with a selected one or more high-priority media items; a media server search component operative to transmit the search term information to a plurality of media servers; receive a plurality of media items from the plurality of media servers in response to the transmitting of the search term information to the plurality of media servers; and select the one or more high-priority media items from the plurality of media items based on priority weights; and a media item evaluation component operative to assign the priority weights to each of the plurality of media items. Other embodiments are described and claimed.

20 Claims, 11 Drawing Sheets

(51) Int. Cl.
*H04L 51/226* (2022.01)
*H04L 51/00* (2022.01)
*H04L 51/08* (2022.01)
*G06F 16/9535* (2019.01)

(52) U.S. Cl.
CPC .............. *H04L 51/08* (2013.01); *H04L 51/16* (2013.01); *H04L 51/26* (2013.01)

(58) Field of Classification Search
CPC ............ G06F 16/24578; G06F 16/435; G06F 3/0482; G06F 9/453; G06F 40/274; G06F 3/04895; H04L 51/08; H04L 51/26; H04L 51/16; H04L 51/04; H04L 51/063; H04L 51/10; H04L 51/18; H04L 67/10; H04L 67/02; H04L 67/2819; H04L 67/306; H04W 4/12; H04N 21/25833; H04N 21/25891; H04N 21/2516; H04N 21/2532; H04N 21/4622; H04N 21/4826; H04N 21/4824
USPC ............................................. 707/751; 706/46
See application file for complete search history.

(56) References Cited

U.S. PATENT DOCUMENTS

| | | | |
|---|---|---|---|
| 8,332,512 B1* | 12/2012 | Wu | G06Q 50/01 709/224 |
| 8,566,403 B2* | 10/2013 | Pascal | G06F 16/24578 709/206 |
| 8,990,235 B2* | 3/2015 | King | G06F 40/197 707/759 |
| 9,405,775 B1* | 8/2016 | Sarukkai | G06F 16/78 |
| 9,444,897 B1* | 9/2016 | Bostick | H04L 67/18 |
| 2005/0187920 A1* | 8/2005 | Tenembaum | G06F 16/951 |
| 2009/0094248 A1* | 4/2009 | Petersen | H04L 51/26 |
| 2010/0159883 A1* | 6/2010 | Pascal | H04L 51/063 455/412.1 |
| 2012/0078830 A1* | 3/2012 | Bodor | G06Q 30/02 706/46 |
| 2013/0226453 A1* | 8/2013 | Trussel | G01C 21/3614 701/533 |
| 2013/0275419 A1* | 10/2013 | Li | H04L 67/2819 707/723 |
| 2013/0339283 A1* | 12/2013 | Grieves | G06F 3/04895 706/46 |
| 2014/0095495 A1* | 4/2014 | Brukman | G06F 16/248 707/732 |
| 2014/0136990 A1* | 5/2014 | Gonnen | H04L 51/18 715/752 |
| 2014/0195549 A1* | 7/2014 | Ahn | G06F 16/9535 707/749 |
| 2015/0050993 A1* | 2/2015 | Blayer | A63F 13/87 463/31 |
| 2015/0156061 A1* | 6/2015 | Saxena | G06F 16/951 715/733 |
| 2015/0331866 A1* | 11/2015 | Shen | G06F 16/24578 707/723 |
| 2016/0066140 A1 | 3/2016 | Gnanasekaran | |
| 2016/0092771 A1* | 3/2016 | Buckley | H04L 67/02 706/52 |

\* cited by examiner

TECHNIQUES TO CONFIGURE MEDIA PACKAGES

RELATED APPLICATIONS

This application is a continuation of, claims the benefit of and priority to previously filed U.S. patent application Ser. No. 14/973,463 filed Dec. 17, 2015, titled "Techniques to Configure Media Packages", which is hereby incorporated by reference in its entirety.

This application is related to U.S. patent application Ser. No. 14/667,576, titled "Techniques to Share and Remix Media Through a Messaging System," filed on Mar. 24, 2015, which is hereby incorporated by reference in its entirety.

This application is related to U.S. patent application Ser. No. 14/844,231, titled "Techniques to Share Application Data Through a Messaging System," filed on Sep. 3, 2015, which is hereby incorporated by reference in its entirety.

BACKGROUND

Users may interact with each other in a messaging system, sending messages back and forth to each other in a text-based conversation between two or more users. A user may have a user account associated with them in the messaging system, the user account providing an online identity for the user, a destination for messages directed to the user, and generally coordinating the user's access to and use of the messaging system. A user may access the messaging system from a variety of endpoints, including mobile devices (e.g., cellphones), desktop computers, web browsers, specialized messaging clients, etc.

SUMMARY

The following presents a simplified summary in order to provide a basic understanding of some novel embodiments described herein. This summary is not an extensive overview, and it is not intended to identify key/critical elements or to delineate the scope thereof. Some concepts are presented in a simplified form as a prelude to the more detailed description that is presented later.

Various embodiments are generally directed to techniques to configure media packages. Some embodiments are particularly directed to techniques to configure media packages using messaging information for a user. In one embodiment, for example, an apparatus may comprise a client support component operative to receive search term information from a client device at a server device; and configure the client device with a selected one or more high-priority media items; a media server search component operative to transmit the search term information to a plurality of media servers; receive a plurality of media items from the plurality of media servers in response to the transmitting of the search term information to the plurality of media servers; and select the one or more high-priority media items from the plurality of media items based on priority weights; and a media item evaluation component operative to assign the priority weights to each of the plurality of media items. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
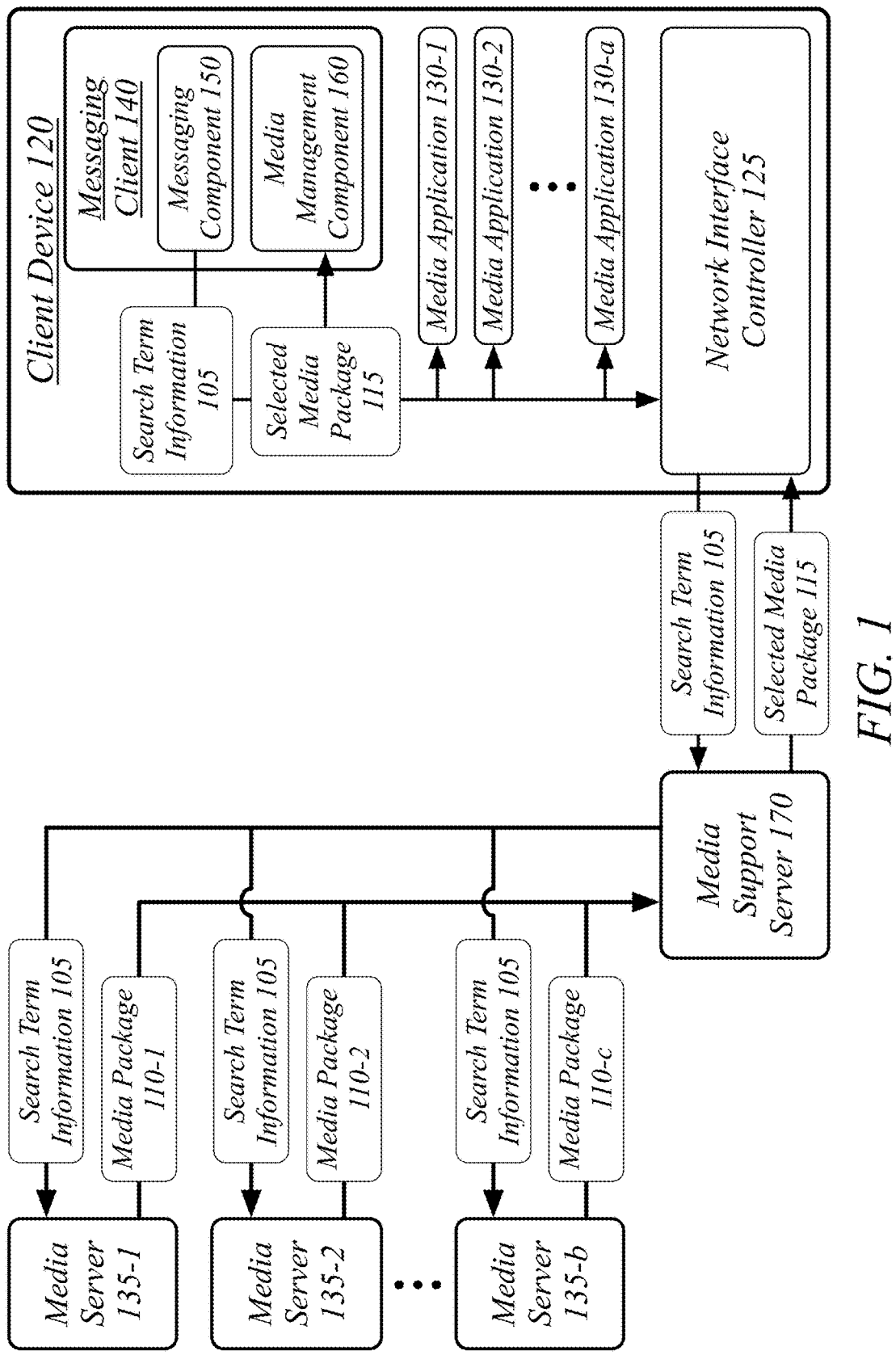
FIG. 1 illustrates an embodiment of a media configuration system.

Users of a messaging system may interact with each other using text supplemented by media content, such as images, animated images, video, audio, and other media items. For example, a user may respond to or supplement a comment regarding a sporting, film, or other media event with media content illustrating or reflecting a viewpoint on that media event. Similarly, a user may respond to media content with other media content in an attempt to continue a media interaction.

Users on mobile devices have access to a vast quantity of media content distributed through the Internet. Users may use a messaging client to communicate with friends, leveraging a wide variety of media applications to store, explore, and discover such media as photographs, animations, movie clips, music, games, and informational content (e.g., movie show times). While these media applications may support sharing, users may benefit from being empowered to import media into their preferred messaging client and share the media within the flow of a messaging conversation.

Users may therefore benefit from being presented with media content relevant to their current conversation and their particular preferences. Relevance to a user's particular preferences may depend on a user's history of media sharing, with everything from the type of media (e.g., video or still) to the type of content (e.g., humorous or informative) being relevant, without limitation to other factors. Relevance to a current conversation may include both temporal indications such as the current topic of discussion (e.g., a media event, a personal event) and a receiving user's or users' preference, such as the preference of the receiving user(s) as to type of media or type of content. By being quickly shown relevant media, a user may be empowered to incorporate media content into their conversations without interrupting the flow of the exchange. As a result, the embodiments can improve the messaging experience, particularly in regards to the appropriateness of shared media to the sender and/or receiver(s), increasing engagement with the messaging system by the sender and/or receiver(s).

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

It is worthy to note that "a" and "b" and "c" and similar designators as used herein are intended to be variables representing any positive integer. Thus, for example, if an implementation sets a value for a=5, then a complete set of components 122 illustrated as components 122-1 through 122-*a* may include components 122-1, 122-2, 122-3, 122-4 and 122-5. The embodiments are not limited in this context.

FIG. 1 illustrates a block diagram for a media configuration system 100. In one embodiment, the media configuration system 100 may comprise a computer-implemented system having software applications comprising one or more components. Although the media configuration system 100 shown in FIG. 1 has a limited number of elements in a certain topology, it may be appreciated that the media configuration system 100 may include more or less elements in alternate topologies as desired for a given implementation.

A user's access to an media configuration system 100 may be a messaging client 140 installed as a user application on a client device 120 and executing locally on the client device. In some cases, the messaging client 140 may include other functionality. For example, the messaging client 140 may be a front-end to a social-networking service, providing messaging services in association with the social-networking service. In many cases, this client device 120 may be a smartphone, cell phone, or other mobile device using a mix of Wi-Fi and cellular data networks to access the Internet and networked resources, though it will be appreciated that any form of network access may be used. For example, one device may tether to another, such as a smart watch tethering to a Internet-capable device (e.g., mobile phone, personal computer) or a mobile phone tethering to a personal computer. The client device may execute a plurality of applications, including the messaging client 140, one or more media applications 130, and other user applications. In other embodiments, however, the client device may comprise a personal computer device, a portable digital assistant, a tablet device, or any other form of computing device. Similarly, in some situations and embodiments, a user may access the media configuration system 100 via a web portal, with the messaging client 140 executing as a web-based application.

The client device 120 may communicate with other devices using wireless transmissions to exchange network traffic. Exchanging network traffic, such as may be included in the exchange of messaging transactions, may comprise transmitting and receiving network traffic via a network interface controller 125 (NIC). A NIC comprises a hardware component connecting a computer device, such as client device, to a computer network. The NIC may be associated with a software network interface empowering software applications to access and use the NIC. Network traffic may be received over the computer network as signals transmitted over data links. The network traffic may be received by capturing these signals and interpreting them. The NIC may receive network traffic over the computer network and transfer the network traffic to memory storage accessible to software applications using a network interface application programming interface (API). The network interface controller 125 may be used for the network activities of the embodiments described herein, including the interoperation of the media applications 130, media servers 135, messaging client 140, and media support server 170 through network communication. For example, the messaging client 140 transmitting search term information to a media support server 170 or receiving a selected media package 115 from a media support server 170 may be interpreted as using the network interface controller 125 for network access to a communications network for the transmission or reception of information.

The media applications 130 may comprise applications for one or more of searching media content, discovering media content, sharing media content, storing media content, accessing media content, modifying media content, and combining media content. Each of the media applications may be associated one or more media services, either a dedicated media application for a particular media service or a media application interoperating with a plurality of media services. Each of the media services may provide one or more media servers 135 for storing, retrieving, and generally exchanging media content. In some embodiments, one or more of the media servers 135 may be internal to a messaging system, with the messaging system providing media content that may be intermingled with media content from third-party media services providing other media content.

The media servers 135 may distribute media packages 110 to the local media application 130 comprising bundles of media packages, wherein each of the media packages 110 comprises a media item (a particular instance of media content) and associated information. The media servers 135 may distribute the media packages 115 to a media support server 170 for the redistribution of at least a portion of the media packages 115 to a messaging client 140. The collection of the media packages 115 from the media servers 135 may be performed in response to searches of the media servers 135 by the media support server 170, such as may be performed based on the messaging client 140 submitting search term information 105 to the media support server 170.

The messaging client 140 may comprise a media management component 160. The media management component 160 may be generally arranged to manage media content within the context of the messaging client 140. The media management component 160 may make media content available to a user of the client device 120 for messaging in the media configuration system 100 and therefore for exchange with other users. The media management component 160 may operate as a crossroads for media from the plurality of media application 130, presenting a unified view on and unified management for a user of the media content of the media applications 130. The media management component 160 may empower the messaging client 140 to interoperate with the plurality of media applications 130, receiving media content from the media applications 130, submitting media content to the media applications 130, invoking the viewing of existing media content within the media applications 130, and moving media content from one of the media applications 130 to another.

The messaging client 140 may comprise a messaging component 150. The messaging component 150 may be generally arranged to provide messaging services to a user of the client device 120. Messaging services may comprise the reception of messages, the sending of messages, the maintenance of a history of messages exchanged, and other messaging-related activities. User of the messaging client 140 may be empowered to engage in messaging conversations with a plurality of other users in both private user-to-user conversations, in private group conversations between three or more users, and in public conversations generally open to the messaging community. The messaging component 150 may interoperate with the media management component 160 to enrich any of these messaging conversations with the media content management by the media management component 160.

The media configuration system 100 may interact with messaging servers from among a plurality of messaging servers. A media support server 170 may operate as an intermediary between the messaging endpoints of users of the media configuration system 100. Messaging servers may track the current network address of a user's active messaging endpoint or endpoints, such as they change network (e.g., a mobile client device 120 moving between Wi-Fi networks, between cellular data networks, and between Wi-Fi and cellular data networks). Messaging servers may queue messages for messaging endpoints when they are offline or otherwise not accepting new messages. Messaging servers may provide an ordering on messages for a particular user so as to provide consistency in the flow of communication between the potentially multiple messaging endpoints that a user might use. Messaging servers may store a messaging history for each user so as to provide access to previously-sent or received messages for a user. The messaging history may include media exchanged between users using the media configuration system 100.

The messaging component 150 may determine search term information 105 based on a messaging conversation. The messaging component 150 may transmit the search term information 105 to a media support server 170 as a request to perform a media search based on the search term information 105. The media support server 170 may distribute the search term information 105 across a plurality of media servers 135 to perform the requested search. In some embodiments, the media support server 170 may augment or supplement the search term information 105 received from the client device 120 with user information for sending and/or receiving user(s) to form the search term information 105 transmitted to the media servers 135.

Search term information 105 may be defined explicitly by the user. A user may enter text in a search field and request media items related to the text entered in a search field. A user may select search term information 105 within a messaging interaction, such as by selecting one or more words using a touchscreen and requesting a media search based on the one or more words. Similarly, a user may select one or more media items and request a media search be performed for related media content. Search term information 105 may additionally or alternatively be automatically extracted from the text of a messaging interaction. In some cases, text may be automatically extracted based on it being marked in the text by the user, such as by being prepended or appended with a particular symbol, for example by prepending with the pound symbol, '#', as may be described as a "hashtag." In some cases, text may be automatically extracted based on it being recognized as a possible keyword. Common keywords may be determined based on their common association with media items and then, when detected, used as search term information 105 when present in a messaging interaction. It will be appreciated that these techniques may be combined. For example, a media search may be manually initiated by a user based on an explicit search term, with the search term information 105 supplemented by an extracted hashtag, keyword, and/or other data.

The media support server 170 may receive a plurality of media packages 110 from the plurality of media servers 135, the media packages 110 comprising one or more media items selected by the plurality of media servers 135 based on the search term information 105. The media support server 170 may select one or more media items from the plurality of media packages 110 based on various criteria, such as may relate to the sending user, receiving user(s), and the media services/application associated with the media servers 135. The media support server 170 may transmit the selected one or more media items to the client device 120 as a selected media package 115. The media management component 160 may receive the selected media package 115, store the selected media package 115, and present one or more media items from the selected media package 115 to the user in association with the user's messaging activity, such as may have generated at least a portion of the search term information 105.

Messages transmitted via the messaging server 180 may include one or more media items. Where a media item for transmission is already stored on the media support server 170 or on a media server accessible to the media configuration system 100 the media support server 170 may refrain from transmitting the media item to the client device 120. A media server may generate or retrieve a hash of a media item and transmit the hash to the media support server 170 to determine whether a media item is already available in the media configuration system 100. The media support server 170 may indicate whether a media item is already available and therefore should not be re-transmitted. The media support server 170 may request the receipt of a media item from a media server when a media item is not determined to be available based on the hash. Similarly, where a media item is represented as a uniform resource locator (URL) to a network-accessible source, the immediate transmission of a media item as part of a media package (e.g., a media package of the plurality of media packages 110 or the selected media package 115) may be avoided. These techniques may serve to reduce the bandwidth used in sharing media items. By using the unified platform of the media configuration system 110, the bandwidth usage of sharing media items may be reduced as the media configuration system 110 has visibility into the network locations of network-accessible media items and may store media items from a plurality of media application sources using hashing to eliminate duplicate transmissions. This reduction of bandwidth usage may increase the speed of media sharing, reduce the usage of a user's bandwidth allocation from a cellular provider, and eliminate the battery usage that may be involved in performing the upload of a application item, thereby reducing the overall battery usage for media sharing.

A media item may be managed and manipulated by the media configuration system 100 according to a variety of techniques in various embodiments. In some cases, the media item may be directly stored as computer data representation within a media package such as media packages 110 or selected media package 115. For example, an image media item may be stored as a Joint Photographic Expert Group (JPEG) digital image file within a media package. In other cases, the media item may be stored as a reference within a media package, the reference comprising a resource locator—such as a URL—providing a network-accessible address for the media item. As such, while the media management component 160 may retrieve and cache an instance of the media item on the client device 120 for local access, the media item may be received using the resource locator so as to avoid using excessive bandwidth in the transmission of selected media package 115. In particular, the media support server 170 may evaluate the media items referenced by the media packages 110 without evaluation of the specific media items—depending instead on received media information about the media items. Instead, the media support server 170 and/or the messaging client 140 on the client device 120 may receive the media item as the resource locator and fetch an instance of the media item after receiving the resource locator. This may reduce the use of bandwidth for the media support server 170 and/or client device 120. Alternatively, the media support server 170 may cache or retrieve the media item and include it with the selected media package 115 when delivering the selected media package 115 to the client device 120. Similarly, one or more of the media servers 135 may transmit an encoding of the media item(s) with the media package transmitted to the media support server 170. It will be appreciated that, in general, any known technique for formatting and storing media content may be used. In some cases, the media configuration system 100 may re-size, re-code, change the format, or change the quality level of a media item prior to uploading or prior to transmission to a client device 120. This may be performed to reduce the storage space used in storing a media item or the bandwidth used in uploading or downloading the media item. Similarly, where a messaging client 140 transmits a media item to a receiving client device, such as part of a messaging conversation, the media item may be transmitted as a reference rather than as encoded data.

The media configuration system 100 may use knowledge generated from interactions in between users. The media configuration system 100 may comprise a component of a social-networking service and may use knowledge generated from the broader interactions of the social-networking service. As such, to protect the privacy of the users of the media configuration system 100 and the larger social-networking service, media configuration system 100 may include an authorization server (or other suitable component(s)) that allows users to opt in to or opt out of having their actions logged by the media configuration system 100 or shared with other systems (e.g., third-party systems), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers or other authorization components may be used to enforce one or more privacy settings of the users of the media configuration system 100 and other elements of a social-networking service through blocking, data hashing, anonymization, or other suitable techniques as appropriate. For example, while interactions between users of a social-networking service and the social-networking service may be used to learn media content preferences and the relationship between preferences for different pieces of media content, these interactions may be anonymized prior to or as part of the learning process.

Figure 2A:
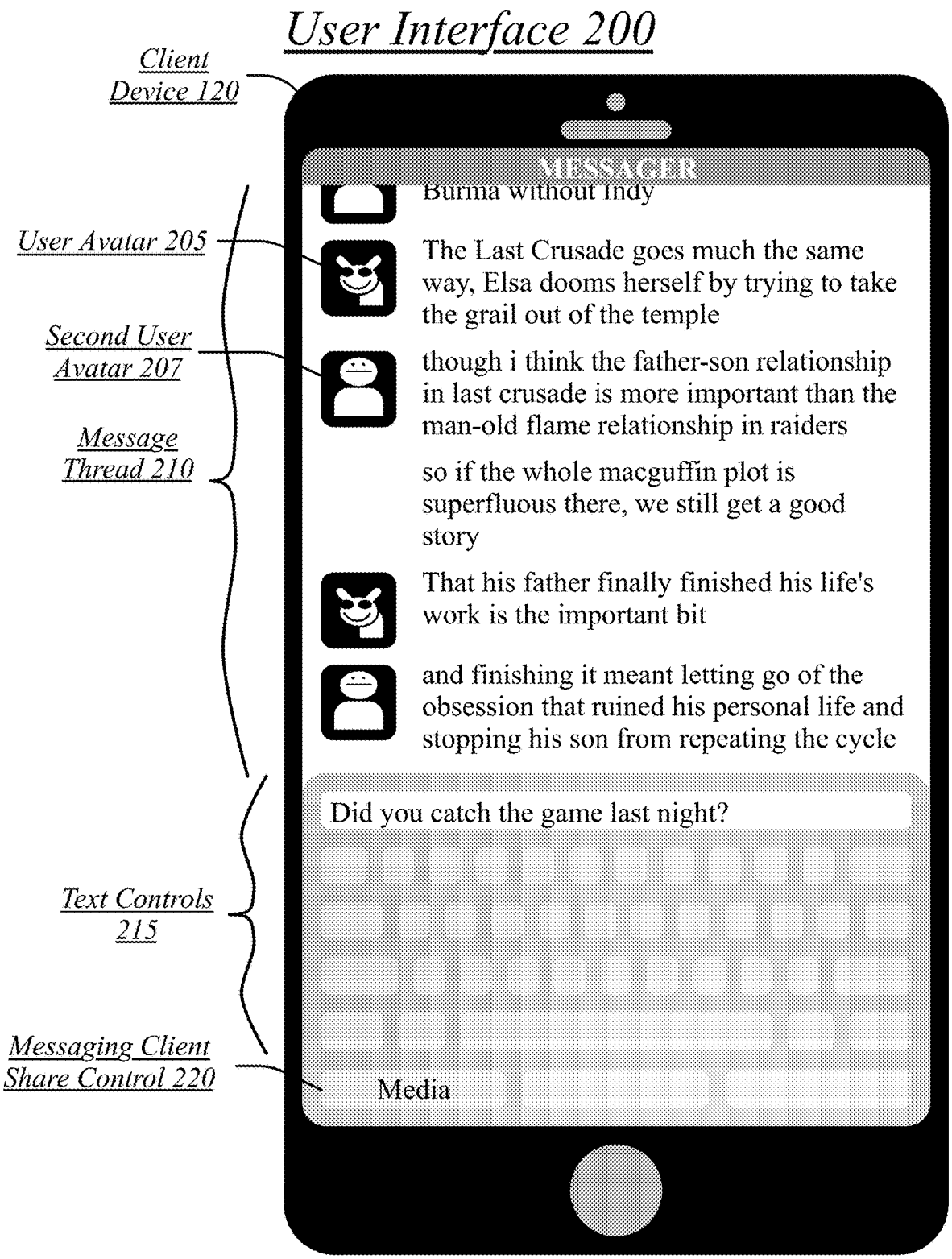
FIG. 2A illustrates a user interface for a messaging client.

FIG. 2A illustrates a user interface 200 for a messaging client 140 on a client device 120.

In the illustrated embodiment of FIG. 2A, the messaging client 140 is displaying a message thread 210. The illustrated message thread 210 corresponds to a private messaging conversation between two users, though it will be appreciated that the described embodiments may be applied to conversations between more than two users, such as group conversation. A first user, the user of the client device 120, is visually represented in the message thread 210 by a user avatar 205 associated with their user account for the media configuration system 100. A second user, the user of a second client device, is visually represented in the message thread 210 by a second user avatar 207 associated with their respective user account for the media configuration system 100.

The user of client device 120 and the messaging client 140 may use text controls 215 to enter textual elements of the message thread 210, such as text messages for transmission to a second user on a second client device. It will be appreciated that while the text controls 215 and other controls of the messaging client 140 are depicted as touch-controls on a touch screen that other controls, including a hardware keyboard and hardware pointer control, may be used with other embodiments.

The user interface 200 includes a messaging client share control 220. The messaging client share control 220 may be used to manually initiate the inclusion of images, audio, video, or other media content. It will be appreciated that additional and alternative sharing controls may be included in various embodiments. For example, while in the illustrated embodiment the sharing control is universal across media types, in another embodiment a plurality of share controls may be used divided amongst content type (i.e., image, animated image, video, and audio). In some cases, sharing controls may be provided for specific forms of content, such as stickers, songs, smilies, emoji, GIFs, and other categories of media content.

The user of the messaging client 140 may select the messaging client share control 220 to initiate the selection of media content for sharing in the message thread 210 with another user. In some embodiments, the messaging client share control 220 may be displayed without the adjacent text controls 215. In some embodiments, a variety of controls may be displayed along the bottom of the user interface 200 for the messaging client 140, with one of the variety of controls invoking the text controls 215 and others one or more of various varieties of sharing controls dedicated to various types of media content.

Figure 2B:
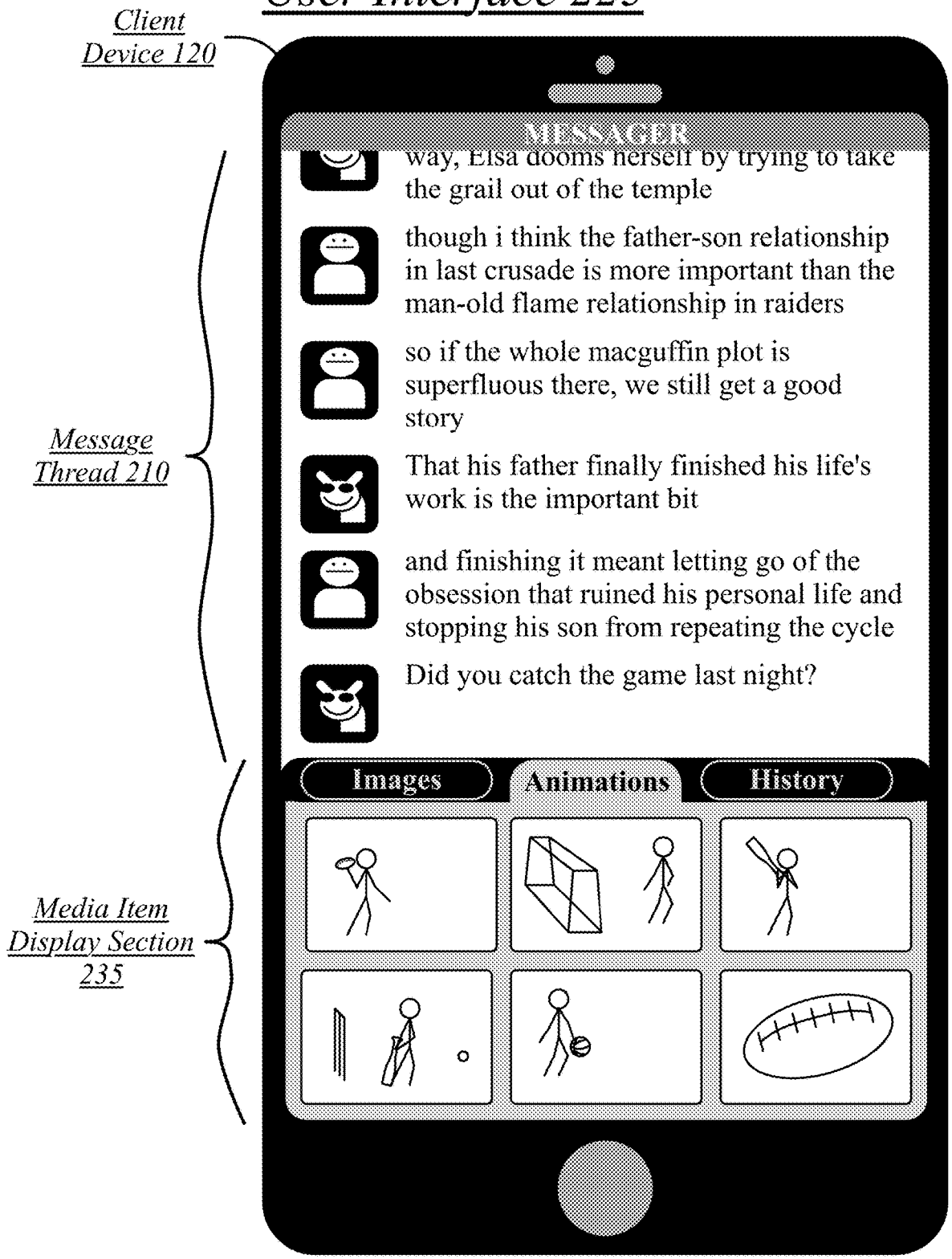
FIG. 2B illustrates a media item display section of a messaging client.

FIG. 2B illustrates a media item display section 235 of a messaging client 140.

In the illustrated embodiment of FIG. 2B, the user interface 225 is displaying media item display section 235. The media item display section 235 displays media content comprising a plurality of media items. In this example, the plurality of media items each comprise an animation (e.g., an animated Graphics Interchange Format (GIF) image). However, in other cases the media items may each comprise a video (e.g., film clip, movie), audio segment (e.g., song, voice recording), still image, any other type of media item, or any combination of different types of media item. The media item display section 235 may be operative to be manipulated via user interface commands to display additional contents, such as by a scrolling command. It will be appreciated that a media item display section 235 may vary in size and quantity of media displayed in various cases and embodiments.

In some cases, the media item display section 235 may be displayed in response to an explicit user request, such as the selection of a messaging client share control 220 as described with reference to FIG. 2A. However, in some embodiments a media item display section 235 may be automatically displayed in response to an automatically-initiated media search, such as in response to a media search automatically initiated based on a keyword automatically extracted from the message thread 210. Further, in some embodiments a media item display section 235 may be left visible through the performance of a messaging conversation, being regularly updated based on the changing contents and context of a messaging interaction. Where a constantly-visible or automatically-displayed media item display section 235 is used, a smaller-size version may be used, such as with only one row of media items. Where a constantly-visible or automatically-displayed media item display section 235 is used, it may be displayed in combination with other messaging controls, such as the text controls 215 described with reference to FIG. 2A.

The media items displayed in the media item display section 235 may be sorted according to a variety of techniques. Each of the media items may be assigned a priority weight based on an evaluation of the appropriateness of each of the media items to the message thread 210, including the users involved and current content of the message thread 210. The media items may be displayed in the media item display section 235 in an order determined by the priority weights, with the items sorted such that the items with the highest priority weight are displayed first and most prominently.

In the illustrated embodiment, the media item display section 235 is displaying a collection of animations gathered from a plurality of media application and collected together in a single view based on the selection of the animations for the user of the client device 120 for use in the present message thread 210. The collection of media items may have been communicated to the messaging client 140 on the client device 120 via the selected media package 115. The selected media package 115 may contain or reference additional animations beyond those presently visible in the media item display section 235. For example, additional animations may be viewable through user interaction with the media item display section 235, such as through scrolling the media item display section 235 using touchscreen or other user input.

Other categories of media content may be made available to the user of the messaging client 140. For example, as illustrated, the user may be able to select an images section by selecting an images tab for the media item display section 235. Similarly, the user may be presented with an audio section, a video section, or other section. The user may also be presented with sections organized according to other criteria. For instance, a "popular" section may be presented, be populated with popular, trending, or otherwise noteworthy media elements as determined by the media configuration system 100 or a particular media application.

In another example, as illustrated, the user may be able to select a "history" section by selecting a history tab for the media element display section 235. A history section may be populated with every media element shared by a particular user. A history section may be populated with every media element shared within a particular conversation, such as the message thread 210, by either user so as to allow either user (or any user in a group conversation) to reference the media history for their shared conversation.

In another example, the user may be able to select a "recommended" section by selecting a "recommended" tab for the media element display section 235. A recommended section may be populated with media elements recommended to the user by the media configuration system 100, with the contents of the recommended section including media of various types (e.g., intermingling two or more of still images, animated images, audio, and video). Media may be recommended based on indiscriminate promotion to all users of the media configuration system 100, may be recommended based on specific promotion to this user, and may be recommended based on specific promotion based on the particular message thread 210, including being based on either or both on the other user(s) contributing to the message thread 210 and analysis of the content of the message thread 210.

In general, a variety of criteria may be used individually or in combination to determine the media elements displayed in a media item display section 235. Media content of predicted interest to a user may be promoted based on explicit and implicit signals. Explicit signals may comprise explicitly-entered information about a user, such as the explicit registration of age/birth date, gender, location of residence, schooling, likes and dislikes, and any other explicit indication of direct interest or association with a category that may suggest a correlation between the interests of different users. Implicit signals may comprise implicitly-determined information about a user, such as information gathered from messaging conversations, automatic geolocation, uploaded photographs, shared media, or other uses of the media configuration system 100 or a social-networking service that are not primarily oriented towards the registration of information but instead oriented towards the use of the system or service while still providing data that may correlate to particular likes or dislikes.

Further, the particular context of the message thread 210 may be used. For example, the media configuration system 100 may provide event-related media elements in response to a conversation identified as pertaining to an event, such as a sporting match, news event, or other type of happening. The media configuration system 100 may provide topic-related media elements in response to a conversation identified as pertaining to a topic, such as a sports, movies, food, or other conversational topics. The media configuration system 100 may provide personally-relevant media elements in response to a conversation addressing or being between particular people, such as promoting recently-uploading photos of a couple in a message thread 210 between the participants in a couple. The media configuration system 100 may particularly promote media elements related to a media element recently shared by an other party in a message thread 210, such as by finding media elements on a similar topic, of a similar subject, or otherwise with a relationship to a recently-shared media element.

The user may be empowered to select a particular media elements from the plurality of media elements displayed in the media item display section 235 and to have that selected media element included in the message thread 210.

Figure 2C:
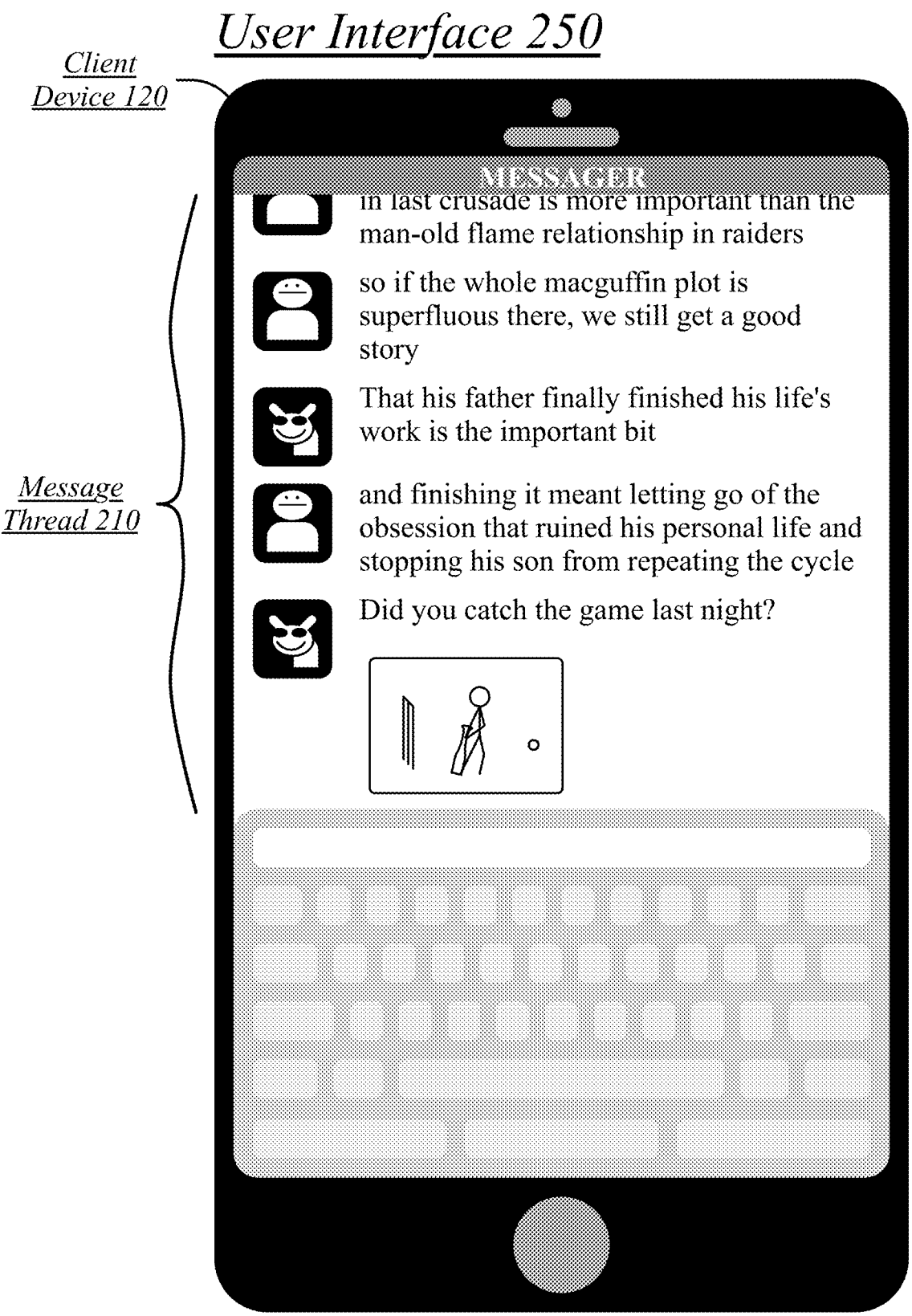
FIG. 2C illustrates a media item display in a messaging client.

FIG. 2C illustrates a media item display in a messaging client 140. In the illustrated embodiment of FIG. 2C, the first user has elected to share a media item corresponding to an image of a cricket batter and this image has been incorporated into the flow of the message thread 210. While in the illustrated embodiment of FIG. 2C the comment from the first user "Did you catch the game last night?" is entered as a distinct line in the messaging conversation, it will be appreciated that in other embodiments such a comment may be optionally included as a caption for the media item as such functionality may be provided by the messaging client 140.

Figure 3:
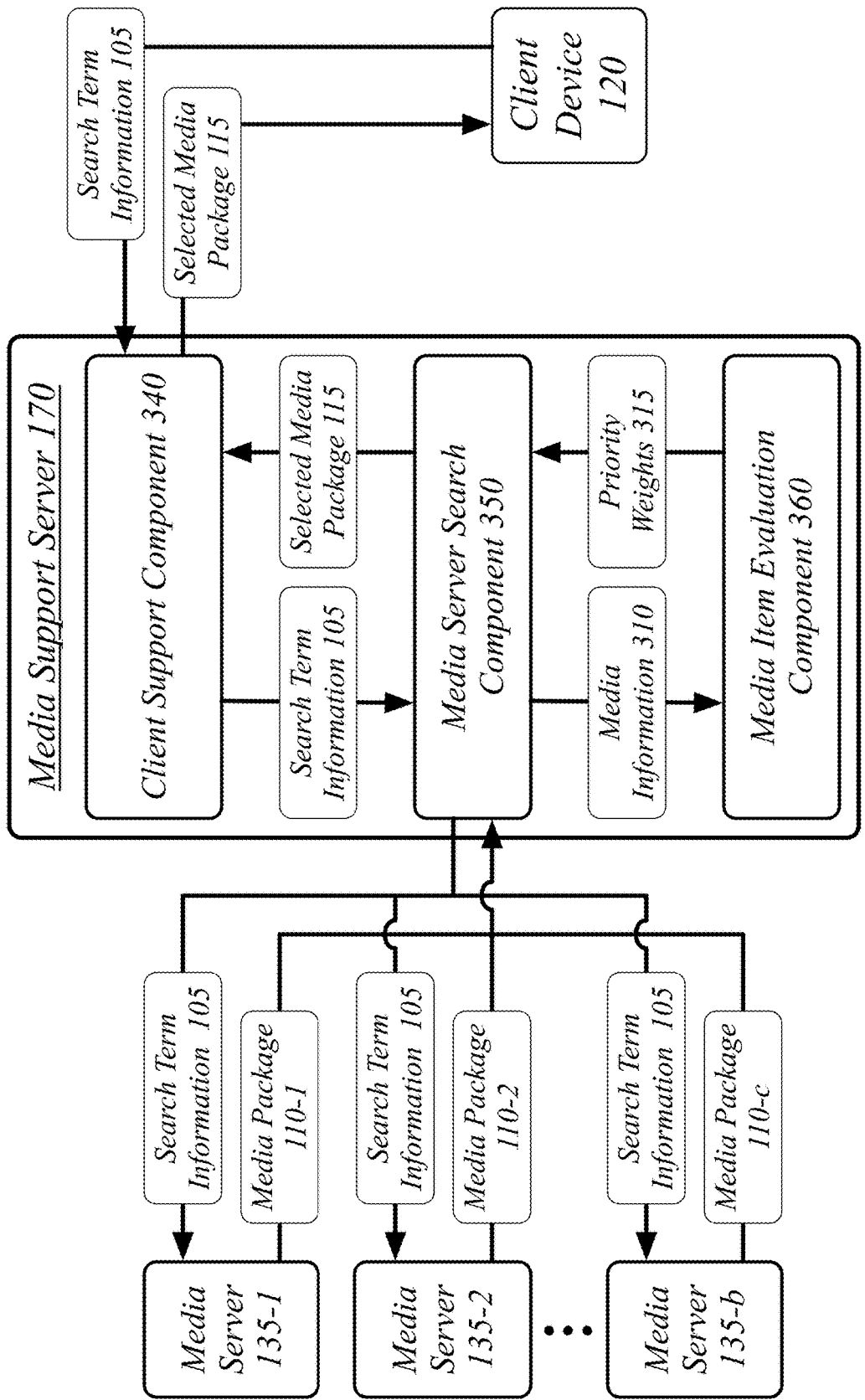
FIG. 3 illustrates a media item search by a messaging client.

FIG. 3 illustrates a media item search by a messaging client 140 being processed by a media support server 170.

The media support server 170 may comprise a plurality of components. The components may comprise software and/or hardware elements. The components may comprise a plurality of routines operative to perform particular tasks. The media support server 170 may comprise a client support component 340, media server search component 350, and a media item customization component 360.

A client support component 340 may be generally arranged to act as a front-end to the server support services of the media configuration system 100 for client devices, receiving requests and responding to the requests to aid the client devices in performing media functions. A client support component 340 may comprise a client media search routine operative to receive search term information 105 from a client device 120, the search term information 105 received in conjunction with and in the performance of a media search request. A client support component 340 may comprise a client media configuration routine operative to configure the client device 120 with a selected one or more high-priority media items in response to the received search term information 105.

A media server search component 350 may be generally arranged to perform searches and requests for media content with one or more media servers 135. The media server search component 350 may be generally arranged to receive one or more media packages 110 from the media servers 135 in response to the requests for media content performed using the search term information 105. The media server search component 350 may comprise a media search routine operative to transmit the search term information 105 to a plurality of media servers 135 as an element of a request for media content. The media server search component 350 may comprise a media reception routine operative to receive a plurality of media items from the plurality of media servers 135 in response to the transmitting of the search term information 105 to the plurality of media servers 135. The plurality of media items may be received as elements of a plurality of media packages 110. In some cases, one or more of the plurality of media servers 135 may not return a response to a search request and/or a response to a search request may be not be considered by the media support server 170 due to, for example, the response taking longer than an allowed amount of time to respond. The media server search component 350 may comprise a selected media package generation routine operative to select the one or more high-priority media items from the plurality of media items based on assigned priority weights 315. The media server search component 350 may generate the selected media package 115 and transmit the selected media package 115 to the client support component 340.

Selecting the one or more high-priority media items from the plurality of media items based on assigned priority weights 315 may be performed according to a variety of techniques. In one embodiment, a threshold may be defined, and all media items meeting or exceeding the threshold may be included in the selected media package 115. In another embodiment, a set number of media items may be defined, and the highest-priority media items up to the limit of the set number of media items may be included in the selected media package 115. These techniques may be also be combined, in which only those media items meeting or exceeding the threshold are included in the selected media package 115, but with a limit of a set number of media items for inclusion, with only the highest-priority media items included where more media items meet or exceed the threshold than allowed for by the set limit.

A media item evaluation component 360 may be generally arranged to evaluate the received plurality of media items according to the sending user information, receiving user information, message context information, and/or other contextual information. The media item evaluation component 360 may comprise a priority weight assignment routine operative to assign priority weights 315 to each of the plurality of media items. The media item evaluation component 315 may generate the priority weights 315 assigned to the media items and transmit the priority weights 315 to the media server search component 350.

The media item evaluation component 360 may evaluate each of the plurality of media items according to one or more rules, with each rule reflecting a condition that, if met, results in an assignment of a priority weight to a media item or a modification of a priority weight assigned to a media item. In some embodiments, each media item may initially receive a default priority weight, be evaluated according to the one or more rules, and result in a final priority weight determined according to one or more priority weight modifications that may be applied according to the one or more priority weight rules. These rules may operate according to metadata for the media items without evaluation of the encoding of the media items themselves. A priority weight rule may specify that media items with metadata meeting a particular criteria should be modified according to the addition, subtraction, multiplication, division, or other mathematical operation using a predefined value.

The media configuration system 100 may preference media items with a smaller file size, or a file size below a particular threshold, particularly where one or more client devices involved in a messaging interaction are using a cellular data connection. In particular, where the sender client device 120 is operating on a cellular data network, smaller file sizes may be preferred due to client device 120 being configured to download a plurality of media items, such that the size of the media items is of particular importance both in reducing overall bandwidth usage (as may impact a user's cellular data allocation) and in improving performance (due to the lower network performance of many cellular data networks). As such, the client support component 340 may comprise a network evaluation routine operative to determine that the client device 120 is on a cellular data network, the cellular data network the current data network being used for a media search. The network evaluation routine may evaluate according to network addressing information included with network packets received from the client device 120, network metadata information included with network packets received from the client device 120, network-identification information included by the client device 120 in its communication with the media support server 170, and/or according to other network-identification techniques. The media item evaluation component 360 may be operative to determine one or more small-file-size media items of the plurality of media items and add a predetermined small-file-size weight boost to the priority weights for the one or more small-file size media items based on the determining that the client device 120 is on the cellular data network. Determining the one or more small-file-size media items may comprise comparing a size of the plurality of media items to a predetermined file-size threshold, with the small-file-size weight boost added to the media items falling below the predetermined file-size threshold.

The media configuration system 100 may preference media items from particular media servers based on those media servers being associated with a preferred media service. The media item evaluation component 360 may be operative to identify one or more preferred-partner media items received from one or more preferred-partner media servers of the plurality of media servers 135. The media item evaluation component 360 may be operative to add a preferred-partner weight boost to the priority weights for the one or more preferred-partner media items based on the identifying of the one or more preferred-partner media items as being received from the one or more preferred-partner media servers.

Preferred media services may be determined according to a variety of techniques, some of which may be used in parallel. In some embodiments, preferred status may be assigned manually based on an agreement for the promotion of a particular media service. In some embodiments, a service may be preferred based on the historic popularity of the service. The media configuration system 100 may assign the one or more preferred-partner media servers a preferred-partner status based on a historic use rate of previous media items distributed by the one or more preferred-partner media servers. In some cases, preferred status may be assigned to increase the priority weight of services with a high historic use rate—such as a historic use rate in a predefined top percentage of all services—so as to preferentially provide users with media content from services which have proven popular. Alternatively, preferred status may be assigned to the increase the priority weight of underused services, increasing the priority weight of media items received from less-commonly used services.

Popular media items may be promoted based on their popularity. A media item may be determined as popular based on the historic sharing rate for the media item, such as where the historic sharing rate exceeds a predefined sharing rate threshold. The media item evaluation component 360 may identify one or more popular media items based on a historic sharing rate for the one or more popular media items and add a popular-item weight boost to the one or more popular media items. The historic sharing rate may be determined as a percentage, proportion, or ratio reflecting the number of times that a media item is selected for sharing by a user out of the number of times that the media item is presented to the user as an option for sharing.

Similarly, unpopular media items may be demoted based on their lack of popularity. The media item evaluation component 360 may identify one or more unpopular media items based on a historic sharing rate for the one or more unpopular media items indicating that a historic sharing rate for the one or more unpopular media items falls below an unpopularity threshold, wherein the historic sharing rate represents a comparison between how often a media item is shared and how often the media item is offered for sharing. The media item evaluation component 360 may then subtract an unpopular-item weight penalty from the one or more unpopular media items.

In some cases, a duplicate media item may be received from two or more media servers. The media server search component 350 may that two or more of the plurality of media items are duplicate media items and eliminate all but one of the duplicate media items from consideration based on the identification of that duplication. The media server search component 350 may determine which of the duplicate media items to retain in consideration based on various criteria. These criteria may depend on the media service, and therefore media server, from which a duplicate media item was received. The media server search component 350 may eliminate one or more of the duplicate media items, wherein the one or more of the duplicate media items are selected for eliminating based on an identification of an associated media server.

In some embodiments, eliminating one or more of the duplicate media items may be performed based on network transmission performance of one or more associated media servers, such as by selecting for retention the duplicate media item from the media server with the highest network performance of the media servers that submitted the duplicate media item in a media package 110. Network performance may be determined based on network statistics generated by the media configuration system 100 (which may include the media support server 170, client devices, and/or other components of the media configuration system 100) that may reflect the average or otherwise representative delay between a media item being requested from a media server and the media item being completely received from the media server by a device.

Alternatively, less-used media services may be promoted where duplicate media items are detected. Each of the plurality of media servers 135 may be associated with a particular media service or media application. A new or less-used media service may be promoted to increase the diversity of media service options by preferentially selected a less-used media service for duplicate media items. One or more media servers 135 may be assigned a less-used media server status manually or automatically (such as based on historic use rates) and automatically selected where duplicate media items are detected.

The search term information 105 received from the client device 120 may be associated with a messaging interaction between a sending user associated with the client device 120 and a recipient user associated with a separate client device. The media configuration system 100 may be generally arranged to promote media content to the sending user that is predicted to be well-received by the recipient user. The media item evaluation component 360 may identify one or more recipient-appropriate media items based on a historic reply rate for the recipient user and add a recipient-preference boost to the one or more recipient-appropriate media items.

In some embodiments, the one or more recipient-appropriate media items may be selected based on a correspondence between one or more media types of the one or more recipient-appropriate media items and a detected user preference for the one or more media types based on the historic reply rate for the recipient user. The historic reply rate may be determined based on how often the recipient user responds to the posting of a particular type of media content, such as through the sending of text and/or media content in reply to the reception of that media content. Alternatively or additionally, recipient-appropriate media items may be identified based on the receiving user's own sending history, such as by selecting recipient-appropriate media items based on a correspondence between one or more media types of the one or more recipient-appropriate media items and a detected user preference for the one or more media types based on the historic send history for the recipient user.

In some embodiments, these rules may be, at least in part, automatically determined. For instance, a rule may capture an evaluation of the relationship between a particular factor of a media item (media type, content type, one or more keywords) and the popularity of that factor with the sender, the receiver(s), or users in general. Based on a messaging history and/or media sharing history for the sender, the receiver(s), and/or the user population of a messaging system, a popularity of various factors may be determined, providing either a positive boost or a negative penalty for particular factors. This relative popularity may be used to, at least in part, determine the priority weights of media items. A correlation between sending rate and/or reply rate may be determined for a particular factor for any or each of the sender, receiver(s), or users in general. Where this correlation is positive a positive factor boost may be added to the priority weight for media items matching that factor for the sender (if the correlation is specifically detected for the sender), for the receiver (if the correlation is specifically detected for the receiver), or for users in general (if the correlation is specifically detected for users in general). Similarly, where this correlation is negative a negative factor penalty may be subtracted from the priority weight for media items matching that factor for the sender (if the correlation is specifically detected for the sender), for the receiver (if the correlation is specifically detected for the receiver), or for users in general (if the correlation is specifically detected for users in general).

Where the search term information 105 is associated with a messaging interaction, a history of that messaging interaction may be used to bolster the search term information 105 when sending the search term information 105 to the plurality of media servers 135. The media server search component 350 may be operative to include at least a portion of a media content history for the messaging interaction with the search term information transmitted to the plurality of media servers. The media content history may comprise a plurality of keywords associated with media items exchanged in the messaging interaction. The media configuration system 100 may maintain, in association with a messaging interaction, the keywords for media items exchanged in the messaging interaction. One or more of these keywords may be added to the search term information 105 and transmitted to the media servers 135. In some embodiments, only the most recent—as may be defined in absolute number and/or defined according to temporal proximity—keywords may be used, such as may increase the relevance of the included keywords to the current context of a messaging interaction.

In some embodiments, keywords may be received from applications as metadata in association with application data received from the applications. These keywords may be used as at least a portion of the search term information 105. Application data may include media content such as a media item. Application data may include reservation information, appointment information, travel information, personal information, or any other information received from an application and included in a messaging interaction. The providing of the keywords received from applications to media applications as at least a portion of the search term information 105 may therefore comprise application-to-application communication mediated by the messaging client 140.

In some embodiments, the media server search component 350 may comprise a media search caching routine operative to cache the plurality of media items in association with the search term information 105. This caching may be only be operative for a limited period of time to avoid the results becoming outdated, such as by setting an expiration time period for all cached results. The media server search component 350 may compare search term information 105 to other recently-received search term information and where they exactly match re-use the previous results. Because the received media items are further evaluated according to messaging context, this may still result in the searching client devices receiving different selected media packages due to differing messaging context. For example, a search for "football" may result in a same plurality of media items, but one client device may receive a selected media package oriented towards animated images while another client device receives a selected media package oriented towards still images due to differing preferences of their respective sending and/or receiving users.

In some embodiments, the media configuration system 100 may accommodate for differences between the languages used by different media servers or within different messaging conversations, or for a variety of languages being used within a particular media server or messaging conversation. The media server search component 350 may translate at least a portion of the search term information from a first language to a second language prior to transmitting the search term information to at least one media server of the plurality of media servers, the portion of the search term information transmitted to the at least one media server in the second language. The media server search component 350 may use any known translation technique, including, without limitation, a keyword-to-keyword map for the first language and the second language. The media server search component 350 may translate from the first language to the second language based on a determination that a media server primarily or partially supports keywords in the second language.

Where a messaging interaction comprises a group conversation, priority weight schemes, priority weight rules, and other techniques for determining priority weights that regard the preferences of a receiving user may be applied for each of the receiving users in the group conversation. For instance, the priority weight for a media item may be subject to positive and negative adjustments for each of the receiving users in a group using the same techniques as described with reference to single receiver users, such as the evaluation of media type or content type preferences. In some embodiments, to prevent receiving group preferences from overwhelming the sender preferences, the effect of receiver priority weight adjustments may be reduced. For instance, any priority weight adjustments tied to a receiver may be divided by the number of receivers. This results in single-receiver cases (i.e., one-on-one conversations) being unaffected, while group conversations effectively have the preferences of the plurality of receivers averaged across all of the receiving users.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 4:
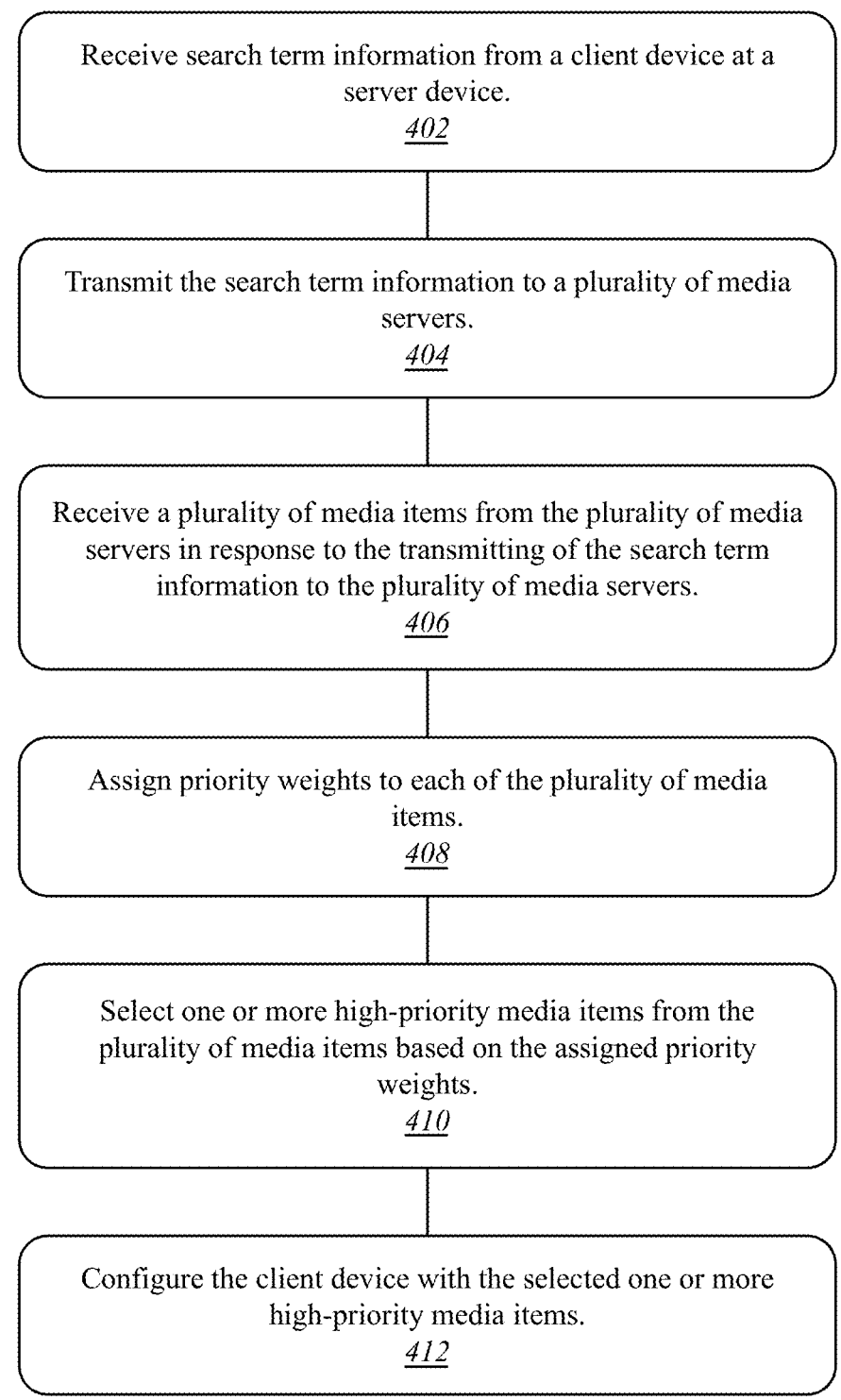
FIG. 4 illustrates an embodiment of a logic flow for the system of FIG. 1.

FIG. 4 illustrates one embodiment of a logic flow 400. The logic flow 400 may be representative of some or all of the operations executed by one or more embodiments described herein.

In the illustrated embodiment shown in FIG. 4, the logic flow 400 may receive search term information from a client device at a server device at block 402.

The logic flow 400 may transmit the search term information to a plurality of media servers at block 404.

The logic flow 400 may receive a plurality of media items from the plurality of media servers in response to the transmitting of the search term information to the plurality of media servers at block 406.

The logic flow 400 may assign priority weights to each of the plurality of media items at block 408.

The logic flow 400 may select one or more high-priority media items from the plurality of media items based on the assigned priority weights at block 410.

The logic flow 400 may configure the client device with the selected one or more high-priority media items at block 412.

The embodiments are not limited to this example.

Figure 5:
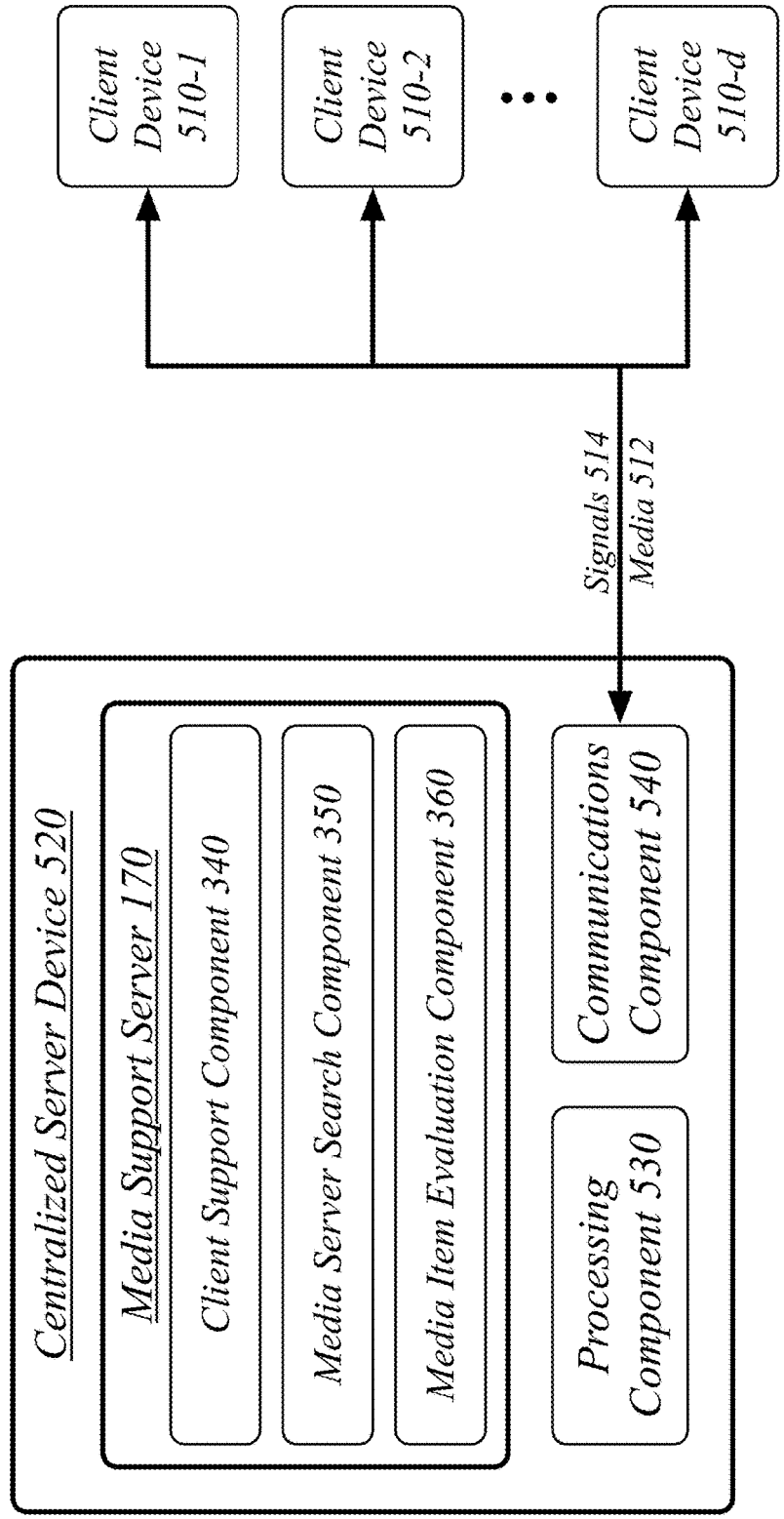
FIG. 5 illustrates an embodiment of a centralized system for the system of FIG. 1.

FIG. 5 illustrates a block diagram of a centralized system 500. The centralized system 500 may implement some or all of the structure and/or operations for the media configuration system 100 in a single computing entity, such as entirely within a single centralized server device 520.

The centralized server device 520 may comprise any electronic device capable of receiving, processing, and sending information for the media configuration system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The centralized server device 520 may execute processing operations or logic for the media configuration system 100 using a processing component 530. The processing component 530 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The centralized server device 520 may execute communications operations or logic for the media configuration system 100 using communications component 540. The communications component 540 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 540 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 512 includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The centralized server device 520 may implement the media support server 170, including the client support component 340, media server search component 350, and media item evaluation component 360. The centralized server device 520 may communicate with other devices over a communications media 512 using communications signals 514 via the communications component 540. The devices may be internal or external to the centralized server device 520 as desired for a given implementation. The devices may include a plurality of client devices 510, such as may be similar to and include client device 120.

Figure 6:
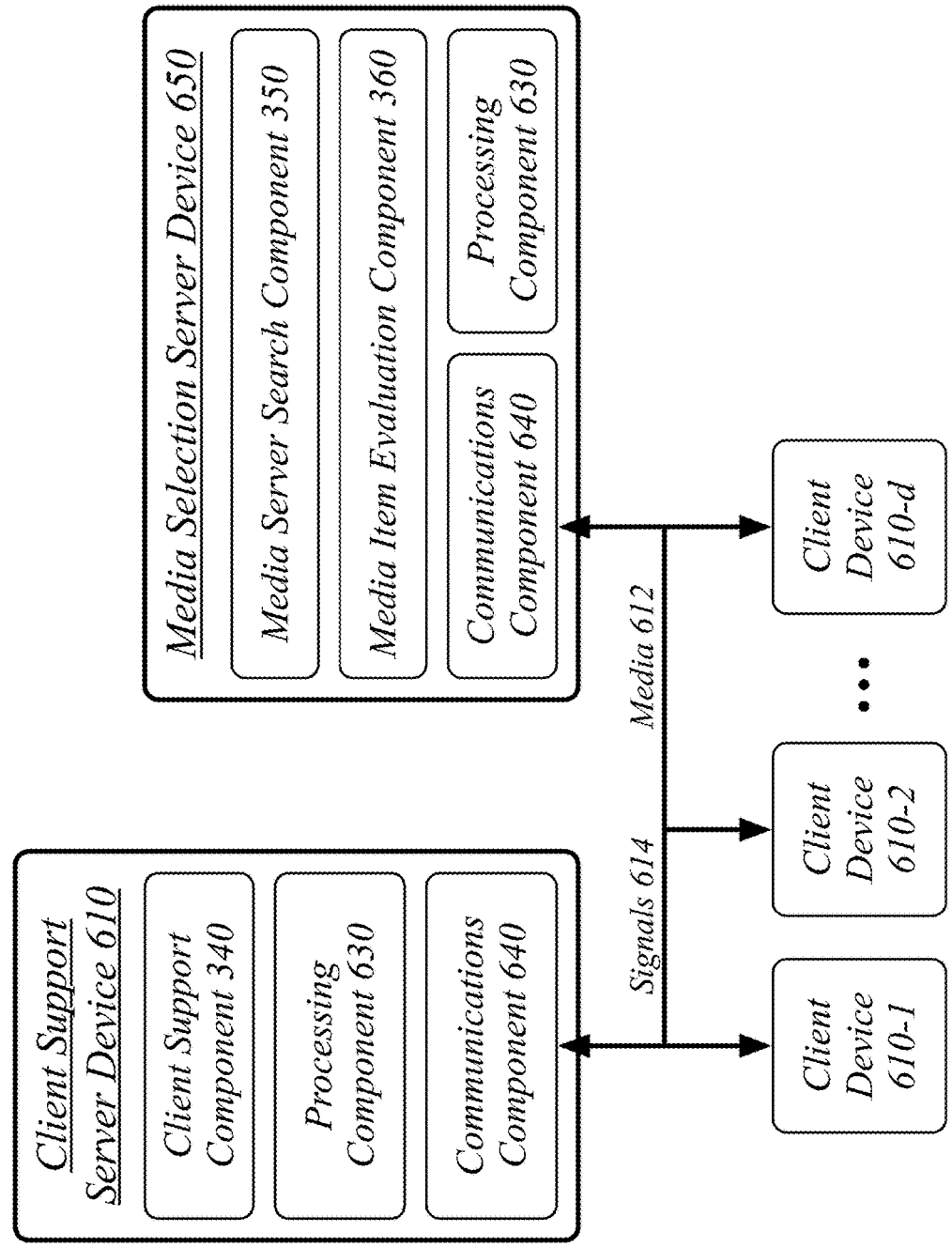
FIG. 6 illustrates an embodiment of a distributed system for the system of FIG. 1.

FIG. 6 illustrates a block diagram of a distributed system 600. The distributed system 600 may distribute portions of the structure and/or operations for the media configuration system 100 across multiple computing entities. Examples of distributed system 600 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 600 may comprise a client support server device 610 and a media selection server device 650. In general, the server devices 610, 650 may be the same or similar to the centralized server device 520 as described with reference to FIG. 5. For instance, the server devices 610, 650 may each comprise a processing component 630 and a communications component 640 which are the same or similar to the processing component 530 and the communications component 540, respectively, as described with reference to FIG. 5. In another example, the server devices

610, 650 may communicate over a communications media 612 using communications signals 614 via the communications components 640.

The client support server device 610 may comprise or employ one or more client programs that operate to perform various methodologies in accordance with the described embodiments. In one embodiment, for example, the client support server device 610 may implement the client support component 340

The media selection server device 650 may comprise or employ one or more server programs that operate to perform various methodologies in accordance with the described embodiments. In one embodiment, for example, the media selection server device 650 may implement the media server search component 350 and media item evaluation component 360.

Signals 614 may correspond to, at least in part, the transmission of information used in the selection of media items for client devices 610. Client devices 610 may generally correspond to client device 510 described with reference to FIG. 5, and may include client device 120.

Figure 7:
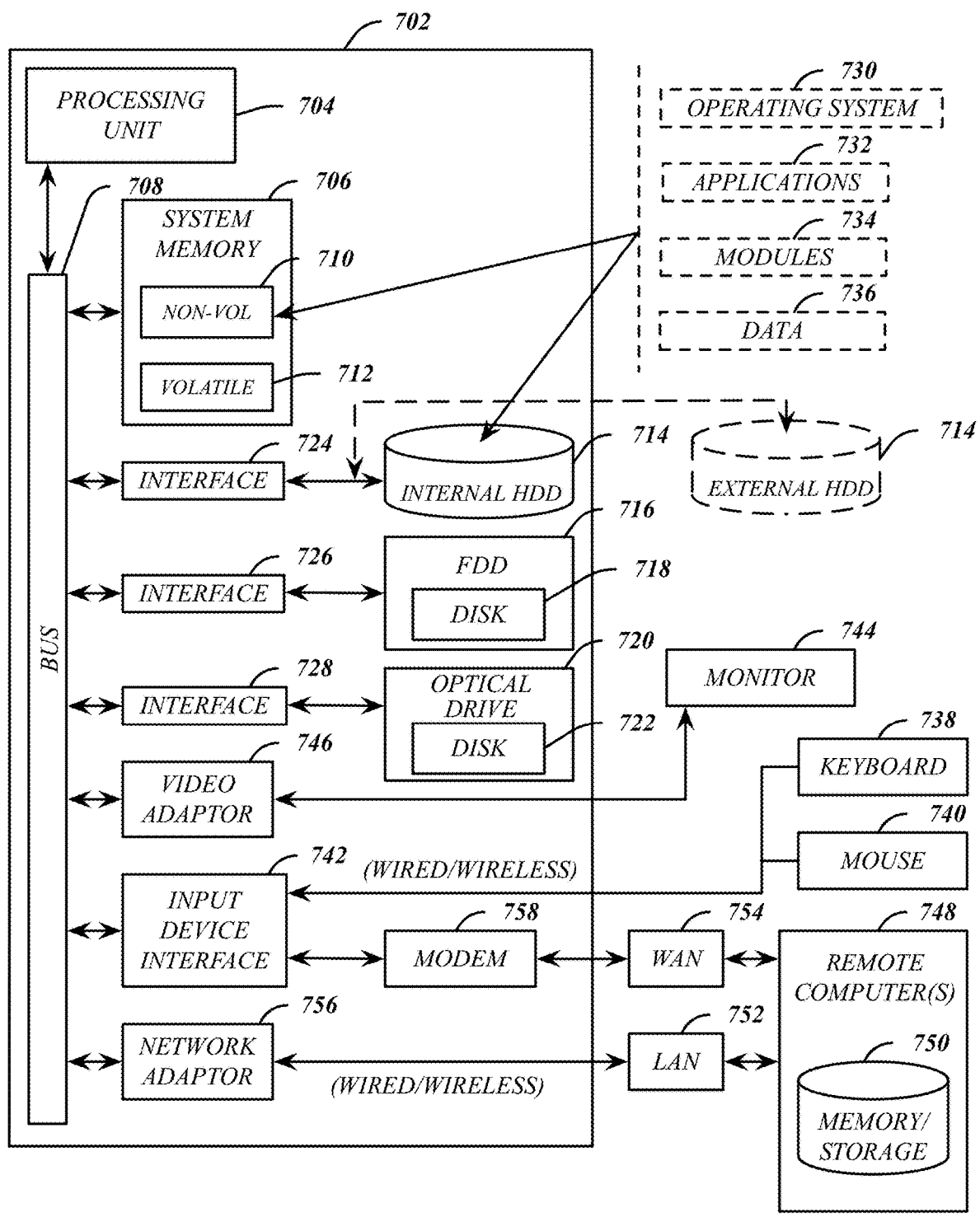
FIG. 7 illustrates an embodiment of a computing architecture.

FIG. 7 illustrates an embodiment of an exemplary computing architecture 700 suitable for implementing various embodiments as previously described. In one embodiment, the computing architecture 700 may comprise or be implemented as part of an electronic device. Examples of an electronic device may include those described with reference to FIG. 5, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 comprises a processing unit 704, a system memory 706 and a system bus 708. The processing unit 704 can be any of various commercially available processors, including without limitation an Athlon®, Duron® and Opteron® processors; embedded and secure processors; DragonBall® and PowerPC® processors; Celeron®, Core (2) Duo®, Itanium®, Pentium®, Xeon®, and XScale® processors; and similar processors. Dual microprocessors, multi-core processors, and other multi-processor architectures may also be employed as the processing unit 704.

The system bus 708 provides an interface for system components including, but not limited to, the system memory 706 to the processing unit 704. The system bus 708 can be any of several types of bus structure that may further interconnect to a memory bus (with or without a memory controller), a peripheral bus, and a local bus using any of a variety of commercially available bus architectures. Interface adapters may connect to the system bus 708 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computer 702 may include various types of computer-readable storage media in the form of one or more lower speed memory units, including an internal (or external) hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736. In one embodiment, the one or more application programs 732, other program modules 734, and program data 736 can include, for example, the various applications and/or components of the media configuration system 100.

A user can enter commands and information into the computer 702 through one or more wire/wireless input devices, for example, a keyboard 738 and a pointing device, such as a mouse 740. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 704 through an input device interface 742 that is coupled to the system bus 708, but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. The monitor 744 may be internal or external to the computer 702. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.7 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.7x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 8:
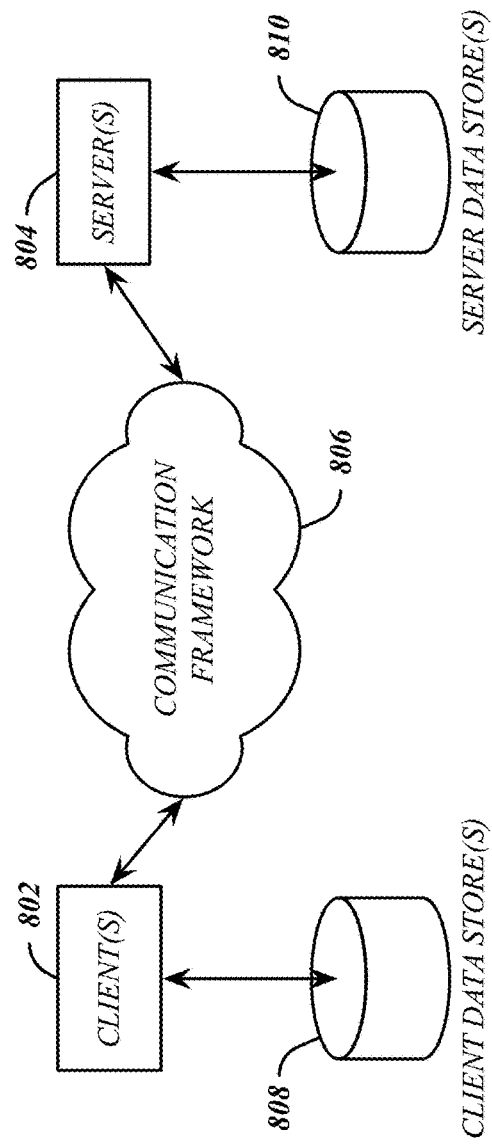
FIG. 8 illustrates an embodiment of a communications architecture.

FIG. 8 illustrates a block diagram of an exemplary communications architecture 800 suitable for implementing various embodiments as previously described. The communications architecture 800 includes various common communications elements, such as a transmitter, receiver, transceiver, radio, network interface, baseband processor, antenna, amplifiers, filters, power supplies, and so forth. The embodiments, however, are not limited to implementation by the communications architecture 800.

As shown in FIG. 8, the communications architecture 800 comprises includes one or more clients 802 and servers 804. The clients 802 may implement the client support server device 510. The servers 804 may implement the media selection server device 550. The clients 802 and the servers 804 are operatively connected to one or more respective client data stores 808 and server data stores 810 that can be employed to store information local to the respective clients 802 and servers 804, such as cookies and/or associated contextual information.

The clients 802 and the servers 804 may communicate information between each other using a communication framework 806. The communications framework 806 may implement any well-known communications techniques and protocols. The communications framework 806 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 806 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 802 and the servers 804. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 9:
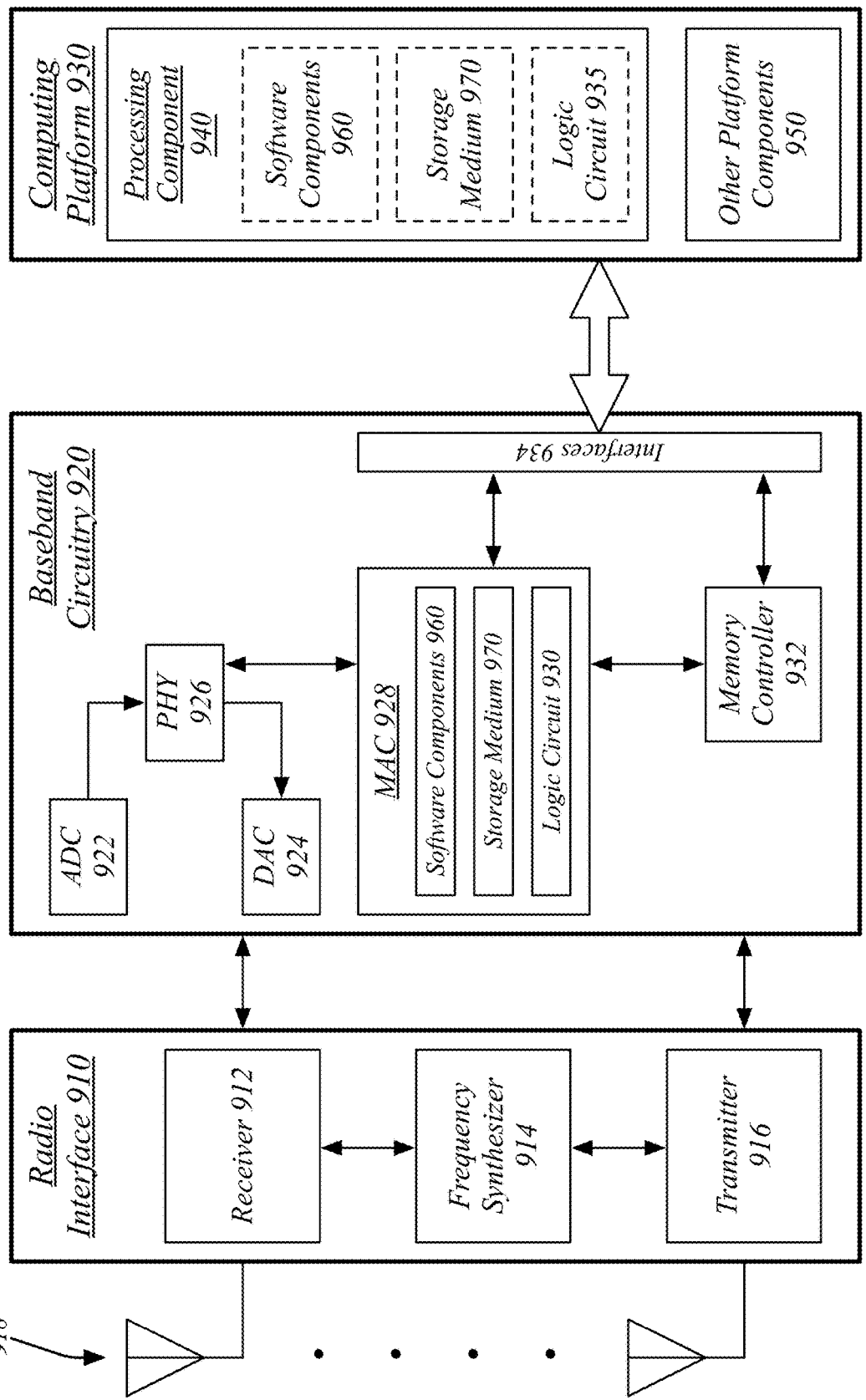
FIG. 9 illustrates an embodiment of a radio device architecture.

FIG. 9 illustrates an embodiment of a device 900 for use in a multicarrier OFDM system, such as the media configuration system 100. Device 900 may implement, for example, software components 960 as described with reference to media configuration system 100 and/or a logic circuit 935. The logic circuit 935 may include physical circuits to perform operations described for the media configuration system 100. As shown in FIG. 9, device 900 may include a radio interface 910, baseband circuitry 920, and computing platform 930, although embodiments are not limited to this configuration.

The device 900 may implement some or all of the structure and/or operations for the media configuration system 100 and/or logic circuit 935 in a single computing entity, such as entirely within a single device. Alternatively, the device 900 may distribute portions of the structure and/or operations for the media configuration system 100 and/or logic circuit 935 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 910 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 910 may include, for example, a receiver 912, a transmitter 916 and/or a frequency synthesizer 914. Radio interface 910 may include bias controls, a crystal oscillator and/or one or more antennas 918. In another embodiment, radio interface 910 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 920 may communicate with radio interface 910 to process receive and/or transmit signals and may include, for example, an analog-to-digital converter 922 for down converting received signals, a digital-to-analog converter 924 for up converting signals for transmission. Further, baseband circuitry 920 may include a baseband or physical layer (PHY) processing circuit 956 for PHY link layer processing of respective receive/transmit signals. Baseband circuitry 920 may include, for example, a processing circuit 928 for medium access control (MAC)/data link layer processing. Baseband circuitry 920 may include a memory controller 932 for communicating with processing circuit 928 and/or a computing platform 930, for example, via one or more interfaces 934.

In some embodiments, PHY processing circuit 926 may include a frame construction and/or detection module, in combination with additional circuitry such as a buffer memory, to construct and/or deconstruct communication frames, such as radio frames. Alternatively or in addition, MAC processing circuit 928 may share processing for certain of these functions or perform these processes independent of PHY processing circuit 926. In some embodiments, MAC and PHY processing may be integrated into a single circuit.

The computing platform 930 may provide computing functionality for the device 900. As shown, the computing platform 930 may include a processing component 940. In addition to, or alternatively of, the baseband circuitry 920, the device 900 may execute processing operations or logic for the media configuration system 100 and logic circuit 935 using the processing component 940. The processing component 940 (and/or PHY 926 and/or MAC 928) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 930 may further include other platform components 950. Other platform components 950 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 900 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of device 900 described herein, may be included or omitted in various embodiments of device 900, as suitably desired. In some embodiments, device 900 may be configured to be compatible with protocols and frequencies associated one or more of the 3GPP LTE Specifications and/or IEEE 902.16 Standards for WMANs, and/or other broadband wireless networks, cited herein, although the embodiments are not limited in this respect.

Embodiments of device 900 may be implemented using single input single output (SISO) architectures. However, certain implementations may include multiple antennas (e.g., antennas 918) for transmission and/or reception using adaptive antenna techniques for beamforming or spatial division multiple access (SDMA) and/or using MIMO communication techniques.

The components and features of device 900 may be implemented using any combination of discrete circuitry, application specific integrated circuits (ASICs), logic gates and/or single chip architectures. Further, the features of device 900 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 900 shown in the block diagram of FIG. 9 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

A computer-implemented method may comprise receiving search term information from a client device at a server device; transmitting the search term information to a plurality of media servers; receiving a plurality of media items from the plurality of media servers in response to the transmitting of the search term information to the plurality of media servers; assigning priority weights to each of the plurality of media items; selecting one or more high-priority media items from the plurality of media items based on the assigned priority weights; and configuring the client device with the selected one or more high-priority media items.

A computer-implemented method may further comprise determining that the client device is on a cellular data network; determining one or more small-file-size media items of the plurality of media items; and adding a small-file-size weight boost to the priority weights for the one or more small-file size media items based on the determining that the client device is on the cellular data network.

A computer-implemented method may further comprise translating at least a portion of the search term information from a first language to a second language prior to transmitting the search term information to at least one media server of the plurality of media servers, the portion of the search term information transmitted to the at least one media server in the second language.

A computer-implemented method may further comprise identifying one or more preferred-partner media items received from one or more preferred-partner media servers of the plurality of media servers; and adding a preferred-partner weight boost to the priority weights for the one or more preferred-partner media items based on the identifying of the one or more preferred-partner media items as being received from the one or more preferred-partner media servers.

A computer-implemented method may further comprise assigning the one or more preferred-partner media servers a preferred-partner status based on a historic use rate of previous media items distributed by the one or more preferred-partner media servers.

A computer-implemented method may further comprise identifying one or more popular media items based on a historic sharing rate for the one or more popular media items; and adding a popular-item weight boost to the one or more popular media items.

A computer-implemented method may further comprise identifying one or more unpopular media items based on a historic sharing rate for the one or more unpopular media items indicating that a historic sharing rate for the one or more unpopular media items falls below an unpopularity threshold, wherein the historic sharing rate represents a comparison between how often a media item is shared and how often the media item is offered for sharing; and subtracting an unpopular-item weight penalty from the one or more unpopular media items.

A computer-implemented method may further comprise determining that two or more of the plurality of media items are duplicate media items; and eliminating one or more of the duplicate media items, wherein the one or more of the duplicate media items are selected for eliminating based on an identification of an associated media server.

A computer-implemented method may further comprise wherein eliminating one or more of the duplicate media items is performed based on network transmission performance of one or more associated media servers.

A computer-implemented method may further comprise the search term information associated with a messaging interaction between a sending user associated with the client device and a recipient user, further comprising: identifying one or more recipient-appropriate media items based on a historic reply rate for the recipient user; and adding a recipient-preference boost to the one or more recipient-appropriate media items.

A computer-implemented method may further comprise the one or more recipient-appropriate media items selected based on a correspondence between one or more media types of the one or more recipient-appropriate media items and a detected user preference for the one or more media types based on the historic reply rate for the recipient user.

A computer-implemented method may further comprise the search term information associated with a messaging interaction, further comprising: including at least a portion of a media content history for the messaging interaction with the search term information transmitted to the plurality of media servers.

A computer-implemented method may further comprise the media content history comprising a plurality of keywords associated with media items exchanged in the messaging interaction.

A computer-implemented method may further comprise caching the plurality of media items in association with the search term information.

An apparatus may comprise a processor circuit on a device; a client support component operative on the processor circuit to receive search term information from a client device at a server device; and configure the client device with a selected one or more high-priority media items; a media server search component operative to transmit the search term information to a plurality of media servers; receive a plurality of media items from the plurality of media servers in response to the transmitting of the search term information to the plurality of media servers; and select the one or more high-priority media items from the plurality of media items based on priority weights; and a media item evaluation component operative to assign the priority weights to each of the plurality of media items. The apparatus may be operative to implement any of the computer-implemented methods described herein.

At least one computer-readable storage medium may comprise instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A computer-implemented method, comprising:
 transmitting, by a messaging application on a client device to a media support server, search term information extracted from a messaging interaction in the messaging application, wherein the search term information is supplemented by a term marked in a text of the messaging interaction;

receiving, by the messaging application from the media support server, one or more media items relating to the search term information;

presenting the one or more media items in a user interface of the messaging application based on a priority weight of each media item, wherein each priority weight is based on a sharing rate of media items, a reply rate by recipients to media items shared via the messaging application, and a popularity of media items;

receiving a selection of one or more of the media items; and including the one or more selected media items in one or more messages in the messaging interaction.

2. The method of claim 1, wherein the search term information comprises one or more search terms explicitly entered at the client device.

3. The method of claim 1, further comprising:
extracting, as the search term information, a first term of a plurality of terms from the text of the messaging interaction.

4. The method of claim 3, wherein the term marked in the text comprises a second term of the plurality of terms from the text of the messaging interaction, wherein the second term is marked in the text of the messaging interaction by prepending a word in the messaging interaction with a hashtag symbol.

5. The method of claim 1, further comprising:
receiving application data from one or more other applications on the client device, the application data including metadata; and
including the application data in the messaging interaction, wherein
the search term information comprises keywords extracted from the metadata received from the one or more other applications.

6. The method of claim 1, further comprising:
receiving one or more media items from one or more media applications on the client device; and
presenting the one or more media items from the one or more media applications on the client device in a unified view with the one or more media items received from the media support server in the user interface of the messaging application.

7. The method of claim 1, further comprising:
receiving a selection of one or more media items included in the messaging interaction; and
sending a request to the media support server for a search to be performed for media items related to the selected one or more media items.

8. The method of claim 1, further comprising:
arranging the one or more media items in the user interface of the messaging application based on the priority weight associated with each media item.

9. An apparatus, comprising:
a processor;
memory, storing instructions that, when executed by the processor, cause the processor to:
transmit, by a messaging application to a media support server, search term information extracted from a messaging interaction in the messaging application, wherein the search term information is supplemented by a term marked in a text of the messaging interaction;

receive, by the messaging application from the media support server, one or more media items relating to the search term information;

present the one or more media items in a user interface of the messaging application based on a priority weight of each media item, wherein each priority weight is based on a sharing rate of media items, a reply rate by recipients to media items shared via the messaging application, and a popularity of media items;

receive a selection of one or more of the media items; and include the one or more selected media items in one or more messages in the messaging interaction.

10. The apparatus of claim 9, wherein the search term information comprises one or more search terms explicitly entered via the user interface.

11. The apparatus of claim 9, the memory storing instructions that when executed by the processor cause the processor to:
extract, as the search term information, a first term of a plurality of terms from the text of the messaging interaction.

12. The apparatus of claim 9, the memory storing instructions that when executed by the processor cause the processor to:
receive application data from one or more other applications on the apparatus, the application data including metadata; and
include the application data in the messaging interaction, wherein
the search term information comprises keywords extracted from the metadata received from the one or more other applications.

13. The apparatus of claim 9, the memory storing instructions that when executed by the processor cause the processor to:
receive one or more media items from one or more media applications on the apparatus; and
present the one or more media items from the one or more media applications in a unified view with the one or more media items received from the media support server in the user interface of the messaging application.

14. The apparatus of claim 9, the memory storing instructions that when executed by the processor cause the processor to:
receive a selection of one or more media items included in the messaging interaction; and
send a request to the media support server for a search to be performed for media items related to the selected one or more media items.

15. The apparatus of claim 9, the memory storing instructions that when executed by the processor cause the processor to:
arrange the one or more media items in the user interface of the messaging application based on the priority weight associated with each media item.

16. A non-transitory computer-readable storage medium comprising instructions that, when executed, cause a system to:
transmit, by a messaging application to a media support server, search term information extracted from a messaging interaction in the messaging application, wherein the search term information is supplemented by a term marked in a text of the messaging interaction;

receive, by the messaging application from the media support server, one or more media items relating to the search term information;

present the one or more media items in a user interface of the messaging application based on a priority weight of each media item, wherein each priority weight is based on a sharing rate of media items, a reply rate by recipients to media items shared via the messaging application, and a popularity of media items;

receive a selection of one or more of the media items; and include the one or more selected media items in one or more messages in the messaging interaction.

17. The non-transitory computer-readable storage medium of claim 16, wherein the search term information comprises a first term of a plurality of terms extracted from the text of the messaging interaction, wherein the search term information further comprises one or more of:

one or more search terms explicitly entered via the user interface.

18. The computer-readable storage medium of claim 16, comprising further instructions that cause the system to:

receive application data from one or more other applications on the system, the application data including metadata; and include the application data in the messaging interaction, wherein the search term information comprises keywords extracted from the metadata received from the one or more other applications.

19. The computer-readable storage medium of claim 16, comprising further instructions that cause the system to:

receive one or more media items from one or more media applications on the system; and present the one or more media items from the one or more media applications in a unified view with the one or more media items received from the media support server in the user interface of the messaging application.

20. The computer-readable storage medium of claim 16, comprising further instructions that cause the system to:

arrange the one or more media items in the user interface of the messaging application based on the priority weight associated with each media item.

* * * * *